(12) United States Patent
Agarwal et al.

(10) Patent No.: US 10,701,075 B2
(45) Date of Patent: Jun. 30, 2020

(54) METHOD AND SYSTEM FOR SECURELY CONNECTING TO FIELD DEVICES IN AN INDUSTRIAL PLANT USING LI-FI AND AUGMENTED REALITY

(71) Applicant: Honeywell International Inc., Morris Plains, NJ (US)

(72) Inventors: Shubham Agarwal, Telangana (IN); Sharath Babu Malve, Karnataka (IN); Pavan Kumar Vunnava, Telangana (IN)

(73) Assignee: Honeywell International Inc., Morris Plains, NJ (US)

( * ) Notice: Subject to any disclaimer, the term of this patent is extended or adjusted under 35 U.S.C. 154(b) by 167 days.

(21) Appl. No.: 15/676,030

(22) Filed: Aug. 14, 2017

(65) Prior Publication Data
US 2019/0052638 A1 Feb. 14, 2019

(51) Int. Cl.
| | |
|---|---|
| *H04L 29/06* | (2006.01) |
| *G06T 19/00* | (2011.01) |
| *H04W 12/08* | (2009.01) |
| *G07C 3/00* | (2006.01) |
| *H04B 10/116* | (2013.01) |

(Continued)

(52) U.S. Cl.
CPC ............ *H04L 63/10* (2013.01); *G05B 19/048* (2013.01); *G06T 19/006* (2013.01); *G07C 3/00* (2013.01); *G07C 9/20* (2020.01); *H04B 10/116* (2013.01); *H04L 63/08* (2013.01); *H04W 12/08* (2013.01); *G05B 19/4185* (2013.01); *G05B 2219/32014* (2013.01); *G05B 2219/39449* (2013.01); *H04W 12/06* (2013.01)

(58) Field of Classification Search
CPC ....... H04L 63/08; H04L 63/10; G05B 19/048; G06T 19/006; H04B 10/116; H04W 12/08
USPC ............................................................ 726/4
See application file for complete search history.

(56) References Cited

U.S. PATENT DOCUMENTS

| | | | | |
|---|---|---|---|---|
| 5,793,963 | A | * | 8/1998 | Tapperson ......... G05B 19/4185 709/201 |
| 9,432,361 | B2 | * | 8/2016 | Mahaffey ............ H04L 63/0853 |

(Continued)

OTHER PUBLICATIONS

"Data Services of Li-Fi in Hospital Management," by Ankit Navalakha, Neelu, Maheshwari; Dept. of Computer Science, Mewar University, Gangrar, Chittorgraph India. vol. 3, issue 8, published Aug. 2014. www.ijsr.net.*

(Continued)

*Primary Examiner* — Dant B Shaifer Harriman

(57) ABSTRACT

Methods and systems for identifying and connecting to field devices in an industrial plant. In an example embodiment, steps or operations can be implemented for providing credentials associated with a user through Li-Fi wireless communications, detecting a light pattern associated with the Li-Fi Wireless communications with a light sensor attached to a field device, transmitting a signal from the light sensor to a controller, which decodes the credentials associated with the user, and if the credentials are authorized, allowing the user to obtain device data associated with the field device wherein said data includes a location of said field device within said industrial plant. Such data can be obtained from a control room and/or a server through a wireless data communications network (e.g., wireless bidirectional communications).

20 Claims, 9 Drawing Sheets

(51) Int. Cl.
*G05B 19/048* (2006.01)
*G07C 9/20* (2020.01)
*H04W 12/06* (2009.01)
*G05B 19/418* (2006.01)

(56) References Cited

U.S. PATENT DOCUMENTS

| | | | |
|---|---|---|---|
| 9,535,415 B2* | 1/2017 | Keller | G05B 19/0428 |
| 9,551,986 B2 | 1/2017 | Lo | |
| 2010/0310258 A1* | 12/2010 | Wang | H04Q 11/0062 398/115 |
| 2014/0226983 A1 | 8/2014 | Vargas | |
| 2014/0282877 A1* | 9/2014 | Mahaffey | H04L 63/0853 726/3 |
| 2015/0349884 A1 | 12/2015 | Bialic et al. | |
| 2016/0020854 A1 | 1/2016 | Engel | |
| 2016/0337863 A1* | 11/2016 | Robinson | H04W 12/08 |
| 2017/0111770 A1 | 4/2017 | Kusens | |
| 2017/0173262 A1* | 6/2017 | Veltz | A61M 5/1723 |
| 2017/0220011 A1* | 8/2017 | Hart | H04L 67/1095 |
| 2017/0276702 A1* | 9/2017 | Freer | G01R 1/0416 |
| 2017/0321923 A1* | 11/2017 | Wiens-Kind | G08B 27/006 |
| 2017/0372055 A1* | 12/2017 | Robinson | H04W 12/06 |
| 2018/0011460 A1* | 1/2018 | Barone | G01N 1/08 |
| 2018/0018473 A1* | 1/2018 | Knibbe | H04L 63/0892 |

OTHER PUBLICATIONS

Navalakha, A. et al., Data Services of Li-Fi in Hospital Management, International Journal of Science and Research (2014) 3(8):1631-1633.

Khare, Y. et al., Li-Fi Technology, Implementations and Applications, International Research Journal of Engineering and Technology (2016) 3(4):1391-1394.

Li-Fi—Wikipedia, printed Jul. 18, 2017, 8 pages.

Dietz, P. et al., Very Low-Cost Sensing and Communication Using Bidirectional LEDs, Mitsubishi Electric Research Laboratories, Jul. 2003, TR2003-35, 19 pages.

Watts, M., Meet Li-Fi, the LED-based alternative to household Wi-Fi, Wired, Jan. 31, 2012, 10 pages.

* cited by examiner

METHOD AND SYSTEM FOR SECURELY CONNECTING TO FIELD DEVICES IN AN INDUSTRIAL PLANT USING LI-FI AND AUGMENTED REALITY

TECHNICAL FIELD

Embodiments are related to field devices employed in industrial and hazardous locations such as industrial plants. Embodiments also relate to wireless communications technologies and protocols for communication with such field devices. Embodiments additionally relate to AR (Augmented Reality) and Li-Fi (Light Fidelity) wireless communications technologies.

BACKGROUND

SCADA (Supervisory Control and Data Acquisition) systems and architectures provide process supervisory control and data collection capabilities used to operate most industrial systems today. Most industrial processes and machines are also controlled by SCADA systems using industrial controllers such as PLCs (Programmable Logic Controllers).

Traditional SCADA systems enable operators to effectively monitor field devices from a remote location whereas field operators rely on legacy hand held devices (e.g., smartphones, tablet computers, etc.) to monitor and configure these devices, which are difficult to operate. A field operator has to remember the asset tags of various field devices and get contextual information based on a tag/ID. This becomes more challenging if the devices are mounted in locations that are not easily reachable or accessible. Current approaches to identify devices based on GPS, Geotags, BLE (Bluetooth Low Energy) beacons, NFC (Near Field Communication) tags, and QR (Quick Response) codes have limitations with respect to accuracy and accessibility.

Conventional approaches to monitoring and configuring field devices in an industrial plant suffer from a number of problems. The first problem involves the time and personnel needed to connect to field devices using, for example, legacy hand held devices. Second, it is very difficult to fetch ID/tag information due to difficulty reaching field devices (e.g., field devices maintained in a high location). Third, may field devices possess power limitations that prevent or limit the ability to implement BLE and Wi-Fi beacon based communication approaches. Fourth, it is difficult to connect with field devices in particular vicinities in an industrial plant without tag information. It is believed that eliminating these problems will lead to greater efficiencies and improvements in identifying and connecting to such field devices.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for communicating with field devices located in industrial and hazardous locations such as industrial plants.

It is another aspect of the disclosed embodiments to provide for methods and systems for identifying and communicating with field devices utilizing AR and Li-Fi wireless communications technologies.

It is yet another aspect of the disclosed embodiments to provide for a contextual enquiry of field devices utilizing Li-Fi wireless communications.

It is still another aspect of the disclosed embodiments to provide for a hybrid AR approach with Li-Fi for ease of field device identification.

The aforementioned aspects and other objectives and advantages can now be achieved as described herein. Methods and systems are disclosed for identifying and connecting to field devices in an industrial plant. In an example embodiment, steps or operations can be implemented for providing credentials associated with a user through Li-Fi wireless communications, detecting a light pattern associated with the Li-Fi Wireless communications with a light sensor attached to a field device, transmitting a signal from the light sensor to a controller, which decodes the credentials associated with the user, and if the credentials are authorized, allowing the user to obtain device data associated with the field device wherein the data includes a location of the field device within the industrial plant. Such data can be obtained from a control room and/or a server through a wireless data communications network (e.g., wireless bidirectional communications).

In addition, for device identification, AR (Augmented Reality) can be utilized to facilitate identification of particular field devices. For example, steps or operations can be implemented for utilizing a mobile device equipped with an automatic moving laser dongle that automatically points a laser to field devices in a range of a camera visibility of a camera associated with the mobile device to detect the field device having the data including the location of the field device within the industrial plant, and displaying the data as AR (Augmented Reality) data via a display screen associated with the mobile device.

For example, in a scenario where a field worker (i.e., a user) needs to find a particular device in his or her vicinity, AR with a Li-Fi based approach can be implemented. That is, the user's mobile device (e.g., smartphone, tablet computer, etc.) can be fitted with an auto moving laser dongle that automatically points a laser to a field device in the mobile device's camera visibility and performs a search for a detection of a required field device with respective details. A mobility server can maintain a database, which associates field devices and their authorized users with actions and events.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. As used herein, the term "and/or" includes any and all combinations of one or more of the associated listed items.

Reference will be made in detail to the disclosed embodiments (exemplary embodiments) of the invention, examples of which are illustrated in the accompanying drawings, and which may be preferred or alternative embodiments. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected.

Figure 1:
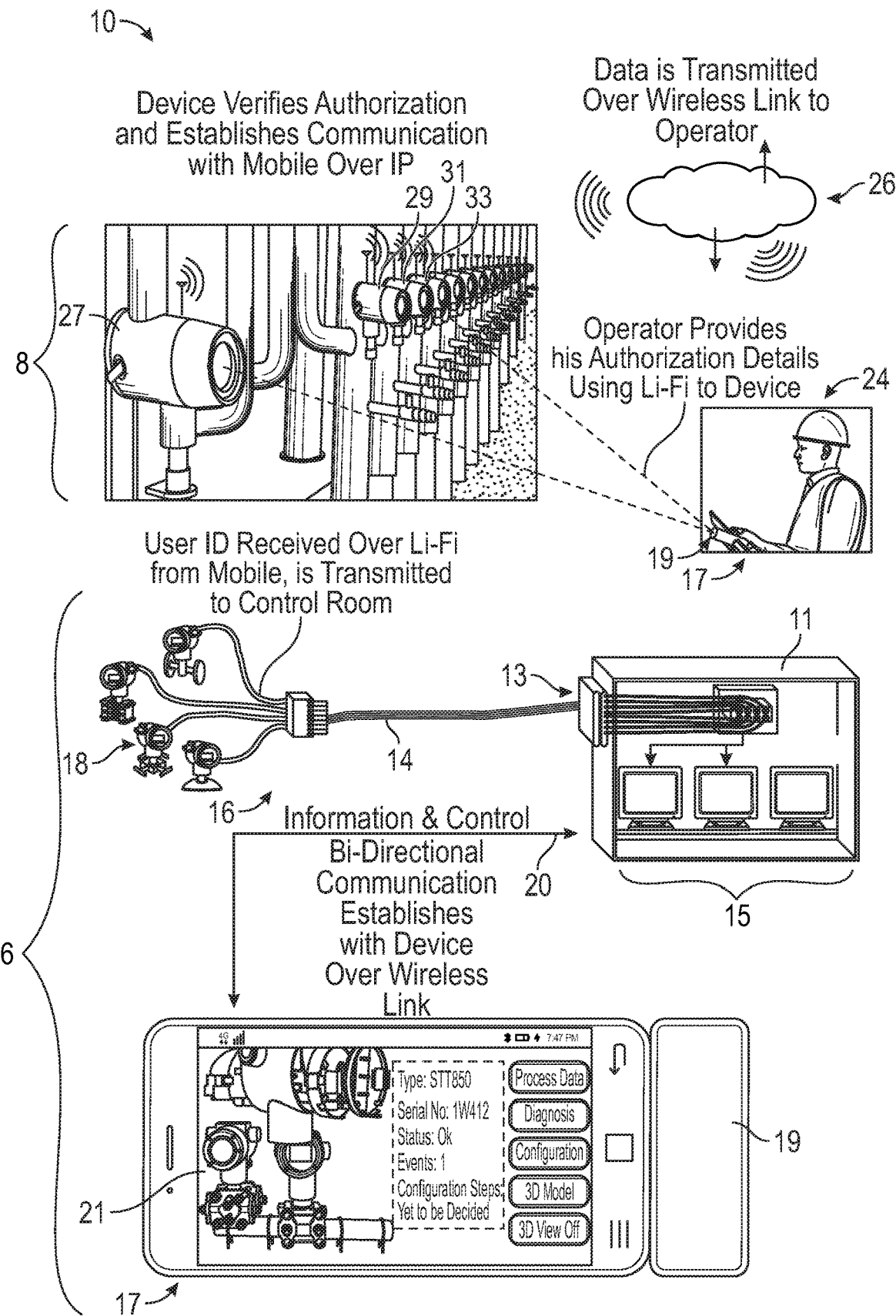
FIG. 1 illustrates a schematic diagram of a system for identifying and connecting to one or more field devices in an industrial plant, in accordance with an example embodiment.

FIG. 1 illustrates a diagram depicting a system 10 for identifying and connecting to one or more field devices in an industrial plant, in accordance with an example embodiment. As shown in FIG. 1, the system 10 involves transmitting data over a wireless link 26 to an operator 24. The operator 24 can provide his or her authorization details using Li-Fi communications to one or more mobile devices 27, 29, 31, 33, and so on. The operator 24 is shown in FIG. 1 holding a mobile device 17 (e.g., a smartphone, tablet computer, etc.) that is equipped with a light sensor 19 that senses a light pattern and transmits a signal to a controller, where the operators credentials can be decoded. Note that each of the mobile devices 27, 29, 31, 33, etc., can be equipped with an antenna capable of communicating via wireless communications (e.g., a wireless data communications network).

System 10 allows for bidirectional communications 20 between the mobile device 17 and a control room 11 that includes host computers and applications and a marshalling panel 13 capable of communicating with the host computers 15 and applications. Note that one or more of the host computers 15 may be legacy computers and/or may run legacy applications. Note that the term "legacy" as utilized herein generally refers to a "legacy device" which is a computing device or equipment that is outdated, obsolete, or no longer in production. This includes all devices that are unsupported or no longer commonly used by most devices and software applications. The term "legacy" may also similarly refer to "legacy applications." Thus one or more of the computers 15 shown in FIG. 1 may be legacy devices and/or may employ legacy applications.

A bundled sensor cable 14 communicates with the marshalling panel 13 and junction box(es) 16 which in turn communicates with a plurality of field devices 18. The user's ID can thus be received for Li-Fi communications from the mobile device 17 which is transmitted to the control room 11. The bidirectional communications 20 (i.e., information and control data) establishes a communication link between the mobile device 17 and the control room (and computers 15) over a wireless link (e.g., a wireless data communications network).

Note that the term Li-Fi (also referred to as "LiFi" or "Li Fi") refers a bidirectional, high-speed and fully networked wireless communication technology that uses a form of visible light communication and a subset of OWC (Optical Wireless Communications), which can be implemented as a complement to RF communications (e.g., Wi-Fi, cellular networks, etc.), or in some embodiments as a replacement of data broadcasting. Li-Fi includes UV visible-light communications or infrared and near-ultraviolet instead of radio-frequency spectrum, part of OWC technology, which carries more information and potentially offers a solution to RFbandwidth limitations. The term "Li-Fi" (or "LiFi" or "Li Fi") as utilized herein thus refers to a communication system wherein information is encoded with a light signal located in a visible part of the electromagnetic spectrum, and may include an LED (Laser Emitting Diode) or other laser emitting means, and a photodetector forming receiving means. The LED can provide a light signal in the visible range. This signal is intensity-modulated, which allows information transmission.

The solution shown in FIG. 1 can provide for a contextual enquiry protocol and a method to identify one or more field devices in an industrial plant. The top portion 8 of FIG. 1 illustrates a contextual enquiry protocol implementation which involves a particular sequence of operations, which are summarized as follows. A user or plant operator 24 provides his or her credentials using Li-Fi. Then, the light sensor 19, which is attached to a mobile device 17 used by the operator 24, senses a light pattern and transmits a signal to a controller, where the operator's or user's credentials are decoded. If authorized by one or more of the field devices 27, 29, 31, 33 etc., the user or operator 24 is allowed to obtain device data from the "cloud" or from a control room (e.g., control room 11) over a wireless data communications link.

The lower portion 6 shown in FIG. 1 generally outlines device identification. For example, in a scenario where a field worker needs to find a particular field device in his or her vicinity, AR with Li-Fi can be employed to assist the field worker with this task. To accomplish this, the mobile device 17 can be fitted with an auto moving laser dongle that assists in automatically pointing a laser to potential field devices within the visibility of mobile device's camera and perform a search for detection of required field devices with respective details displayed in a display area 21 of the mobile device 17. A mobility server, for example, can maintain a database, which associates field devices such as field devices 18 or field devices 27, 29, 31, 33, etc., with their authorized user with particular actions and events.

Note that the mobile device 17 discussed and illustrated herein is an example of a hand held device, which may be, for example, a client device that communicates with other computers or computer devices or servers via wireless communications such as facilitated by a wireless data communications network. Thus, the mobile device may be a client device implemented as, for example, in some cases, a desktop computer or a portable device, such as a cellular telephone, a Smartphone, a display pager, a radio frequency (RF) device, an infrared (IR) device, a Personal Digital Assistant (PDA), a handheld computer, a tablet computer, a laptop computer, a desktop computer, a set top box, a wearable computer, or an integrated device combining various features, such as features of the forgoing devices or the like.

Such a client device may vary in terms of capabilities or features. The claimed subject matter is intended to cover a wide range of potential variations. For example, a cellular telephone (e.g., a smartphone) may include a numeric keypad or a display of limited functionality, such as a monochrome liquid crystal display (LCD) for rendering text and other media. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

In some cases, such a client device may include or may execute a variety of operating systems, including in some example embodiments a personal computer operating system, such as a Windows, iOS or Linux, or a mobile operating system, such as iOS, Android, or Windows Mobile, or the like. Such a client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, Google+®, to provide only a few possible examples.

Such a client device may also include or execute an application to communicate content, such as, for example, textual content, multimedia content, or the like. Such a client device may also include or execute an application to perform a variety of possible tasks, such as browsing, searching, playing various forms of content, including locally stored or streamed video, or games (e.g., fantasy sports leagues, etc.). The foregoing is provided to illustrate that claimed subject matter is intended to include a wide range of possible features or capabilities.

Figure 2:
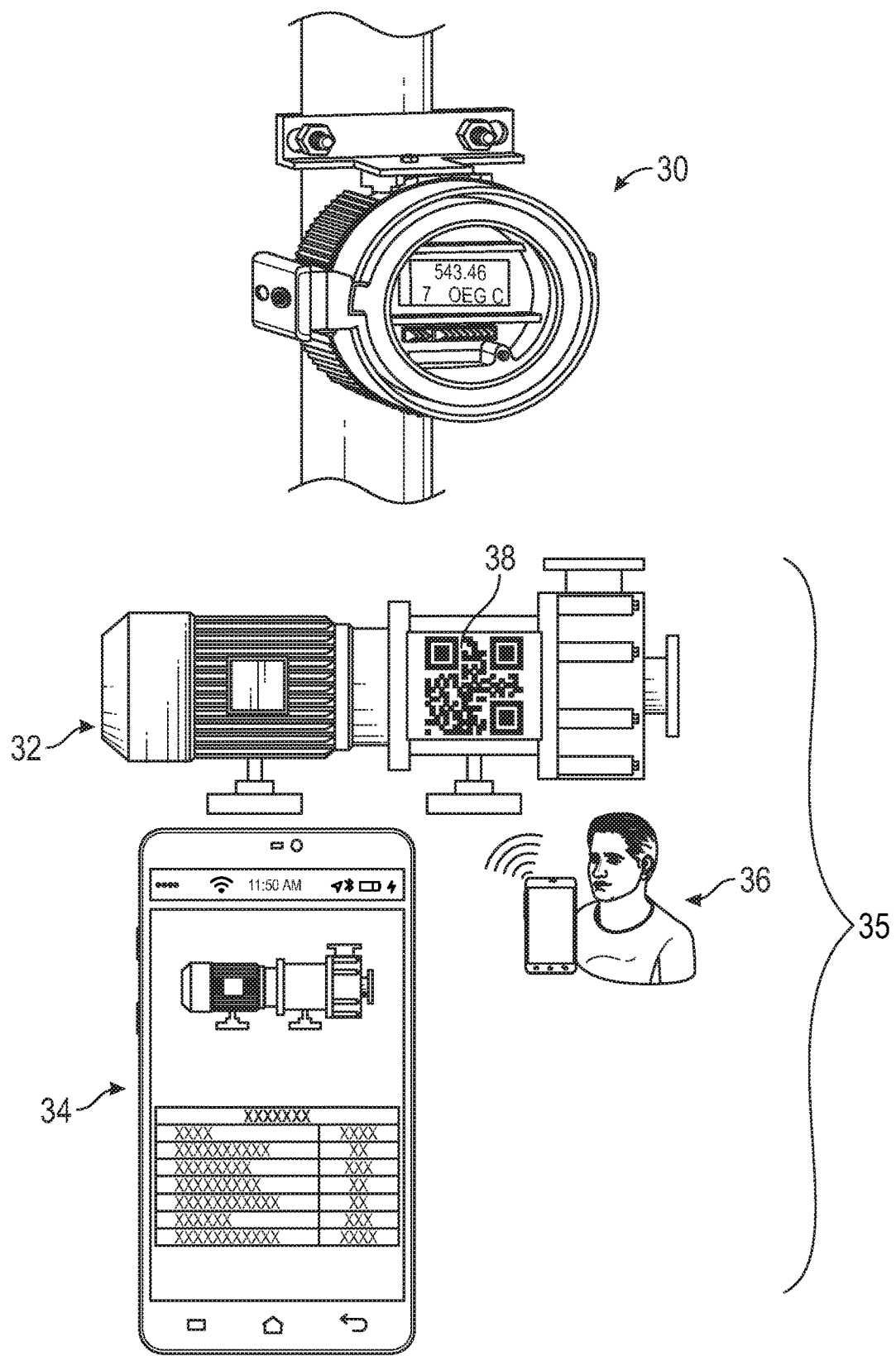
FIG. 2 illustrates pictorial diagrams depicting prior art approaches to capturing data from field devices.

FIG. 2 illustrates pictorial diagrams depicting prior art approaches to capturing data from field devices. Generally, fields workers are required to fetch or remember device details such as asset tags to connect with legacy hand held device or mobile applications. Industrial plants are fitted with thousands of devices carrying individual IDs. In many scenarios, these field devices are kept at heights or in hazardous environments where obtaining field device details is a challenge. For example, to connect to the field device 30, a user must obtain a unique ID associated with this field device from a control room or by connecting his or her hand-held device (e.g., smartphone, tablet computing device, etc.) over a wired connection. In the scenario 35 shown in FIG. 5, QR codes such as the QR code 38 associated with the field device 32 is not easily accessible with respect to the hand-held device 34 associated with a user 36, and there are not reliable approaches available for field devices kept at heights or hazardous locations within, for example, an industrial plant.

The solution offered by the disclosed embodiments thus eliminates the need for a field device's ID/tag information required for unique identification to the user. Plant worker details can be transmitted to a device, which are verified for authorization over, for example, SCADA. These details are also provided by the disclosed Li-Fi approach. The user's mobile device (e.g., a hand-held device) will point a laser to a field device of interest, as required by the user.

Note that as utilized herein, the term SCADA (Supervisory Control and Data Acquisition) refers to systems that implement industrial processes or industrial control systems. For example, a SCADA system may monitor and control a manufacturing process using communications with sensors, actuators, and field devices (e.g., programmable logic controllers or remote terminal units). The SCADA system provides control capabilities and a user interface for interacting with the control and data acquisition of the process. Various applications can be performed by a SCADA system. A configuration application may be operated as a tool to tag or otherwise label field devices included in the controlled process. Business object applications may monitor progress of a part being manufactured or process being performed. Other application clients may include visualization applications, workflow monitoring, reporting, or communications applications. Note the terms "SCADA" and "SCADA system" can be utilized interchangeably to refer to the same general system.

Figure 3:
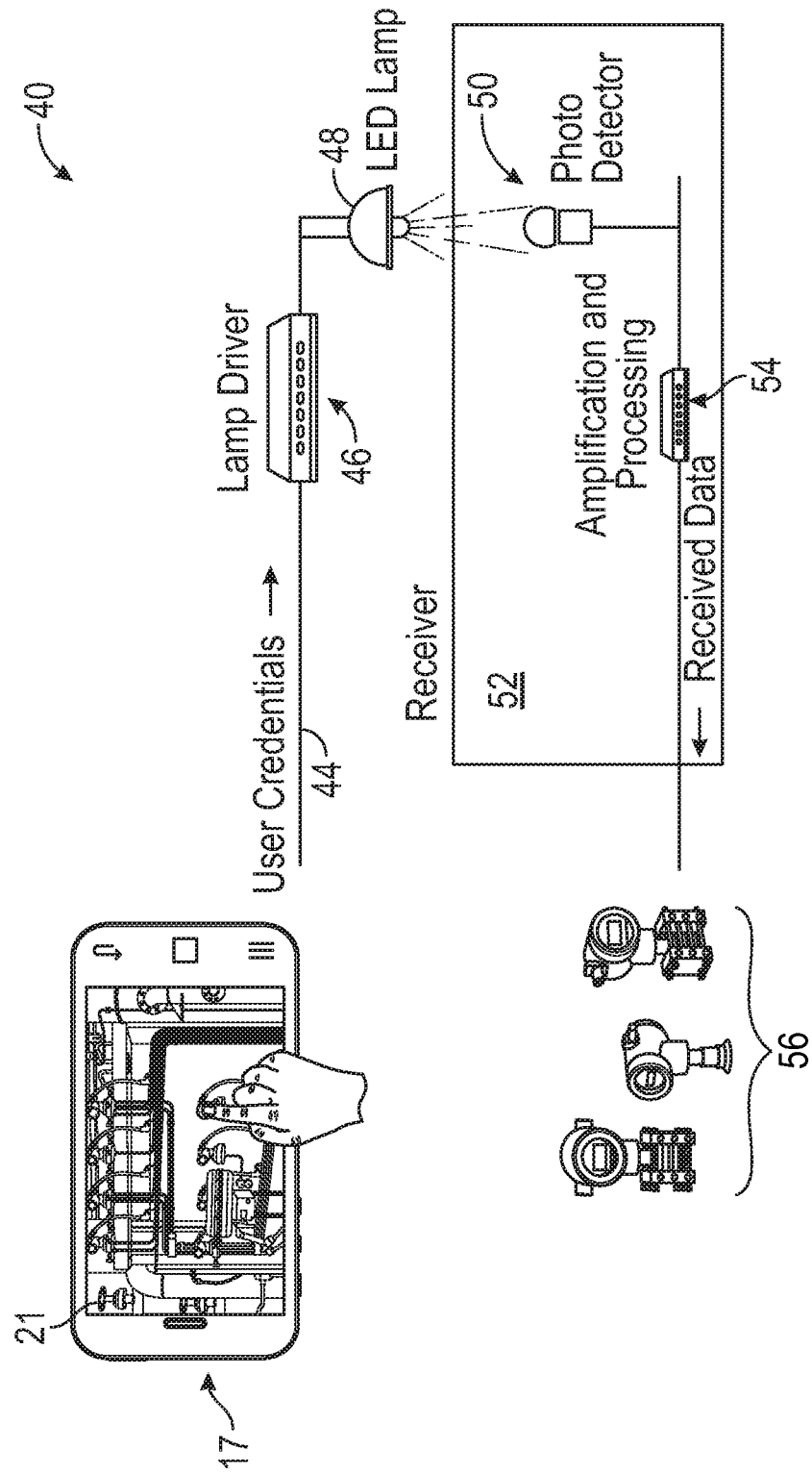
FIG. 3 illustrates a diagram depicting a system for identifying and connecting to one or more field devices in an industrial plant utilizing Li-Fi communications, in accordance with an example embodiment.

FIG. 3 illustrates a diagram depicting a system 40 for identifying and connecting to one or more field devices in an industrial plant utilizing Li-Fi (Light Fidelity) communications, in accordance with an example embodiment. Note that similar or identical reference numerals illustrated and discussed herein refer to identical or similar parts or elements. For example, the mobile device 17 shown in FIG. 3 includes the display area or display 21 also shown in FIG. 1. In the example scenario shown in FIG. 3, user credentials are transmitted from the mobile device 17 to a lamp driver 46, which in turn is connected to an LED lamp 48. An LED (Light Emitting Diode) can flicker at extremely high speeds which is undetectable by human eyes. Nonetheless, a photodetector 50 will pick up the signal easily and then covert the received signal into an electric current to provide such a speed. As shown in FIG. 3, a receiver 52 includes the photodetector 50 which communicates electronically with an amplification and processing unit 54, which in turn transmits the received data to one or more field devices 56.

Figure 4:
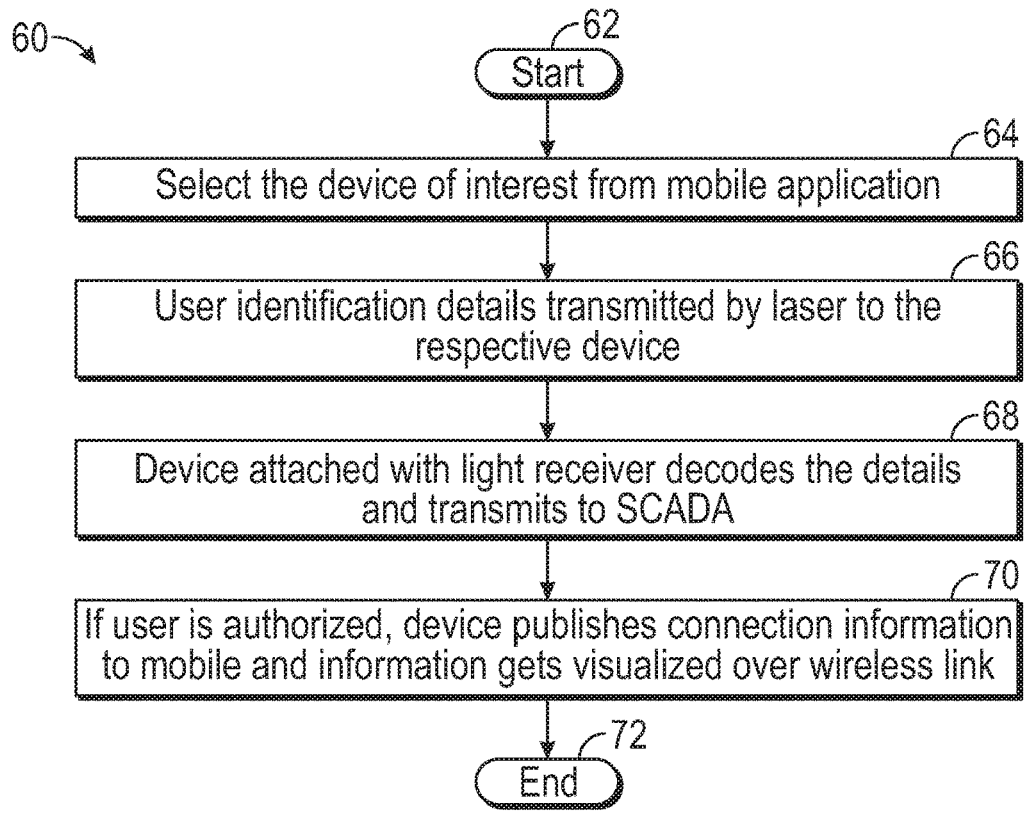
FIG. 4 illustrates a flow chart of operations depicting logical operational steps of a method for identifying and connecting to one or more field devices in an industrial plant, in accordance with another example embodiment.

FIG. 4 illustrates a flow chart of operations depicting logical operational steps of a method 60 for identifying and connecting to one or more field devices in an industrial plant, in accordance with another example embodiment. The method 60 shown in FIG. 4 allows facilities connection to a field device of interest in a vicinity of a user such as, for example, the field operator 24 shown in FIG. 1. As indicated at block 62, the process begins. Then, as shown at block 64, a step or operation can be implemented in which a field device of interested is selected from a mobile application or "app" running on a mobile device such as, for example, mobile device 17. Thereafter, as depicted at block 66, a step or operation can be implemented in which user ID (Identification) details are transmitted by laser (e.g., Li-Fi Communications) to a respective field device. A field device attached with a light receiver can then decode the details and transmit such details as data to SCADA, as shown at block 68. If a user is determined to be authorized, the field device publishes its connection to the user's mobile device and the information is then visualized over a wireless link, as depicted at block 70. The process then terminates, as shown at block 72.

Figure 5:
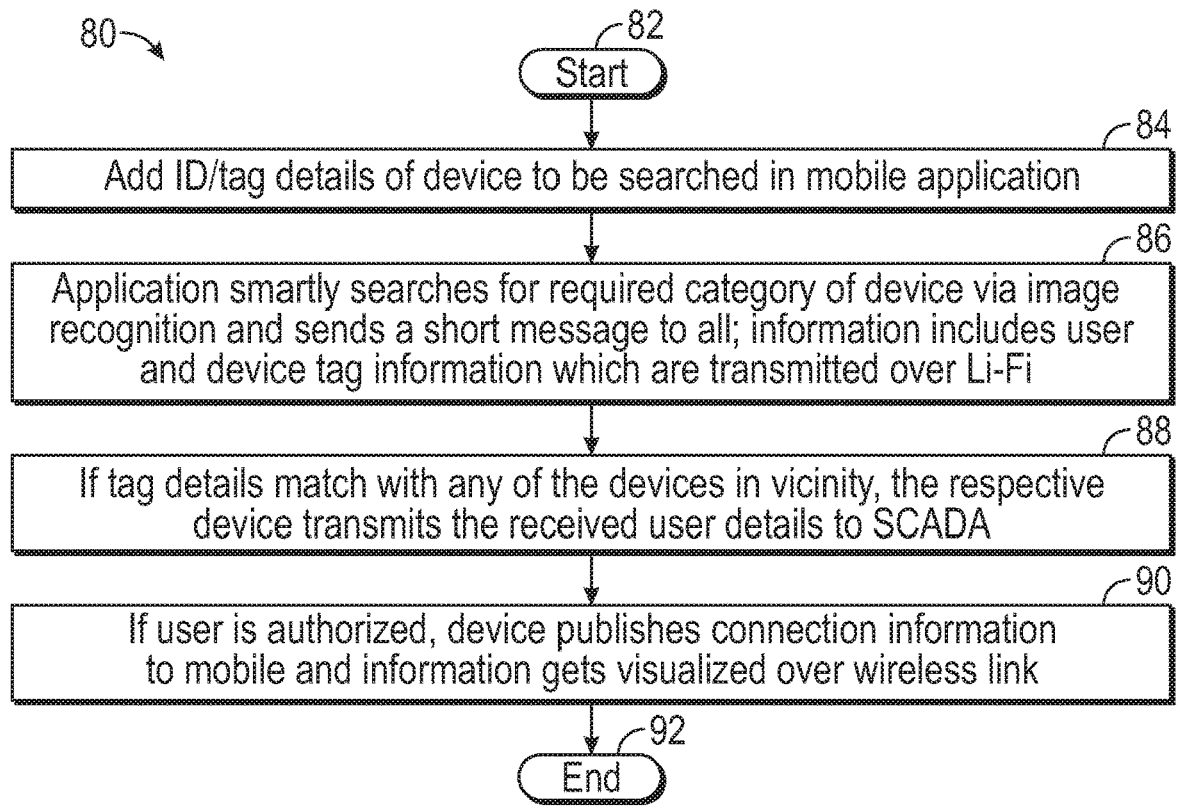
FIG. 5 illustrates a flow chart of operations depicting logical operational steps of a method for identifying and connecting to one or more field devices in an industrial plant, in accordance with yet another example embodiment.

FIG. 5 illustrates a flow chart of operations depicting logical operational steps of a method 80 for identifying and connecting to one or more field devices in an industrial plant, in accordance with yet another example embodiment. The method 80 shown in FIG. 5 facilitates a search for a specific field device with ID details already known by a mobile application or "app." As shown at block 84, a step or operation can be implemented in which ID/tag details of a field device are searched in a mobile app. Then, as shown at block 86, a step or operation can be implemented in which the "app" is instructed to search for a required category of field device via image recognition and a short message is sent to all devices. Information includes user and device tag information, which is transmitted over Li-Fi communications as discussed herein.

Thereafter, as shown at block 88, a step or operation can be implemented wherein if tag details match with any of the field devices in the user's vicinity, the respective field device transmits the received user details to SCADA. Then, as shown at block 90, if the user device is determined to be authorized, the field device(s) publishes connection information to the mobile device and the information is visualized over a wireless link. The process then terminates as shown at block 92.

Figure 6:
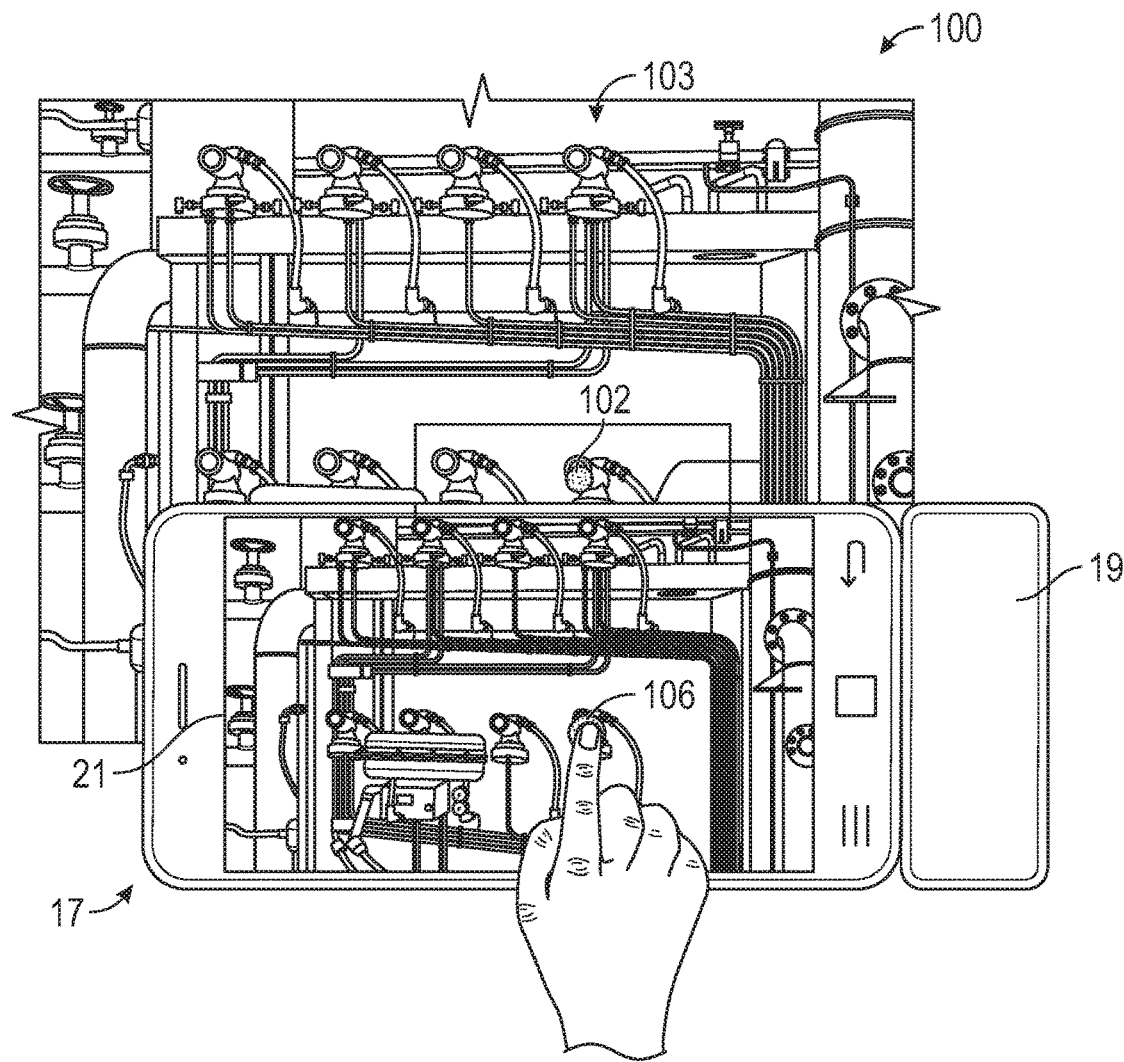
FIG. 6 illustrates a pictorial diagram depicting a laser pointed to a device by a pointer and a dongle that takes input from a mobile device and automatically points to a respective field device, in accordance with an example embodiment.

FIG. 6 illustrates a pictorial diagram 100 depicting a laser pointed to a device by a pointer and a dongle that takes input from a mobile device 17 and automatically points to a respective field device, in accordance with an example embodiment. The illustration depicted in FIG. 6 shows an image displayed in the display area 21. The image may include images of various components and hardware including, for example, images of one or more field devices. A user can tap on a device 106 of interest shown in the image. The dongle takes input from the mobile device 17 and automatically points to the respective device 102 shown in the inset image 103. That is the laser 19 points to the device 102 corresponding to the device 106 shown in the display 21.

Figure 7:
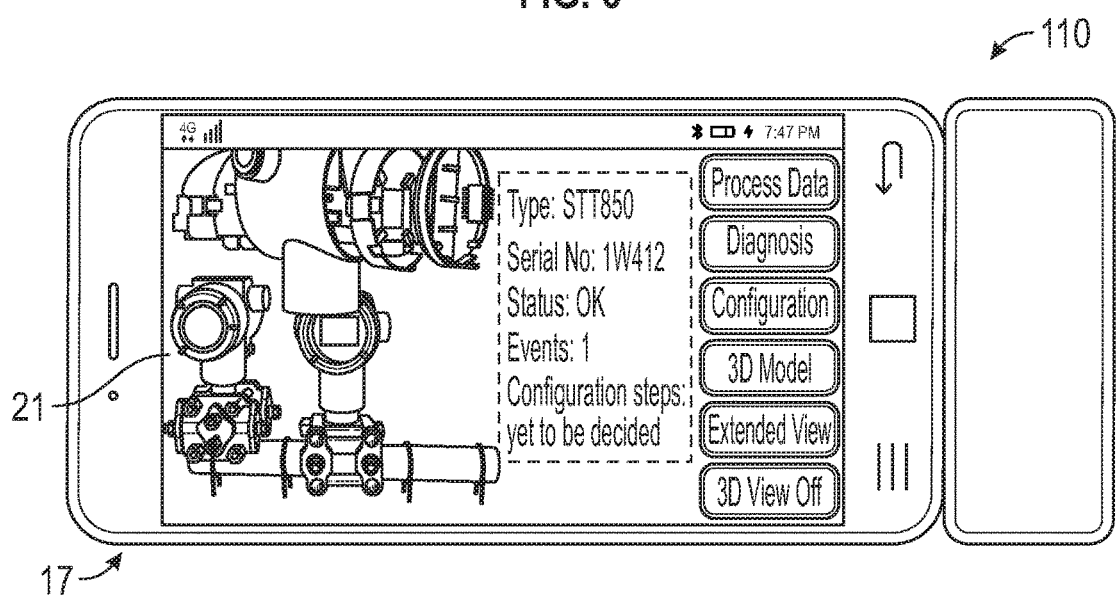
FIG. 7 illustrates a pictorial view depicting process data, diagnosis, configuration, a 3D extended view, and support features provided with AR displayed in the context of a mobile device, in accordance with an example embodiment.

FIG. 7 illustrates a pictorial diagram 110 depicting process data, diagnosis, configuration, a 3D extended view, and support features provided with AR displayed in the context of the mobile device 17, in accordance with an example embodiment. That is, the image shown in the display area 21 in FIG. 7 shows a graphic of a field device along with displayed touch screen graphical buttons or icons that when touched by a user can trigger actions or operations including Process Data, Diagnosis, Configuration, 3D Model, Extended View, and 3D/View Off.

It should be appreciated that the disclosed embodiments offer a number of benefits over conventional approaches. For example, the disclosed embodiments establish a quick mobile interface with one or more field devices, and improves safety by eliminating the need to enter in hazardous area or climbing at height to fetch field device tag details. In addition, such embodiments can transform the way we look at data by providing AR (Augmented Reality) based visualization. Additionally, such embodiments provide information based on a person's role and allows for the recoding of actions on or at a central system. With this approach, all relevant documents and support information related to a particular field device are readily available for a user via a wireless link and displayable via the user's mobile device such as the mobile device 17 illustrated herein.

Figure 8:
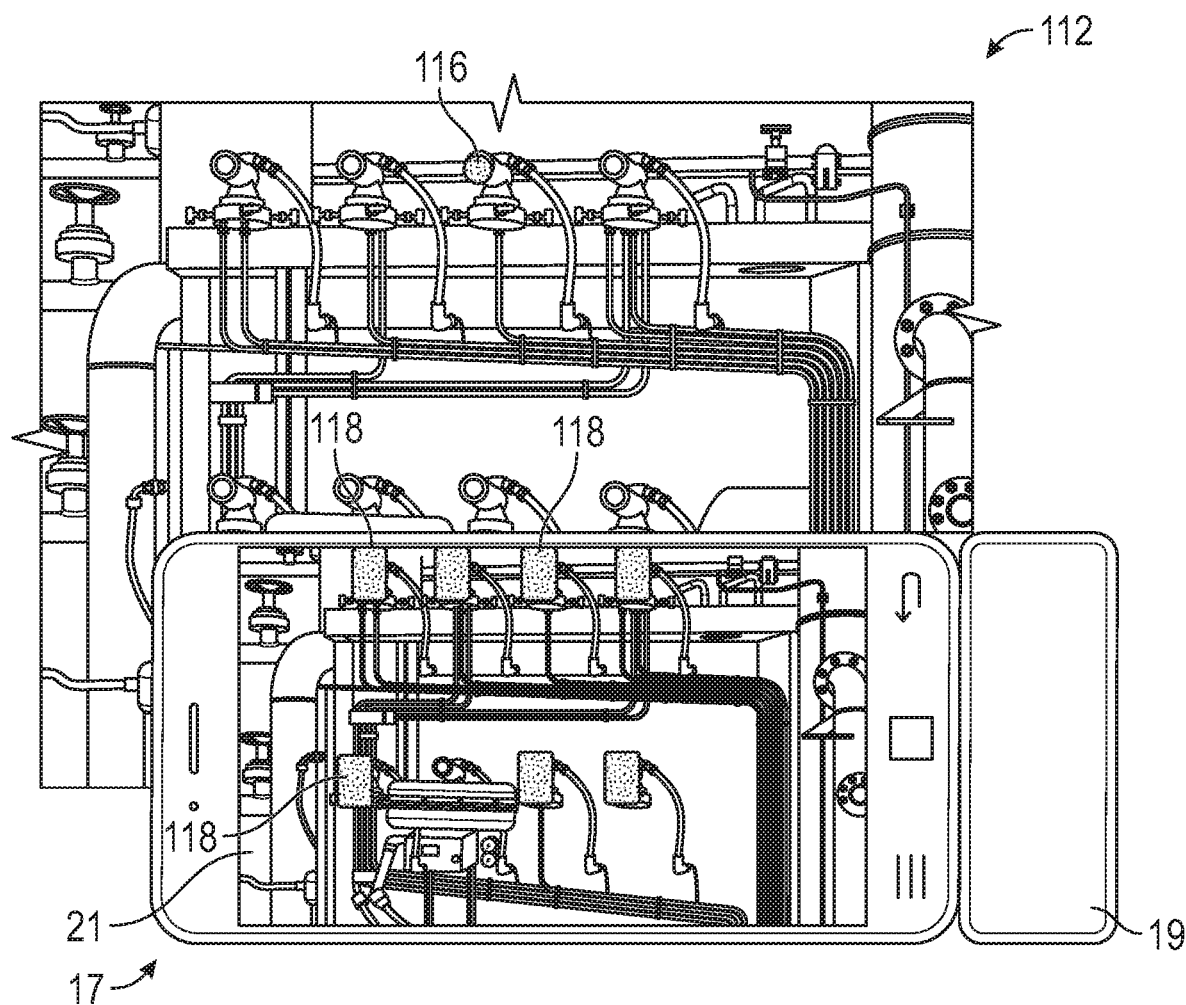
FIG. 8 illustrates a pictorial view depicting image recognition identifying the type of device required, the use of Li-Fi, and the detection of a device with Tag/ID details provided by a user in the context of a mobile device, in accordance with an example embodiment.

FIG. 8 illustrates a pictorial view 112 depicting image recognition identifying the type of device required, and the use of Li-Fi, and the detection of a device with Tag/ID details provided by a user in the context of a mobile device, in accordance with an example embodiment. FIG. 8 illustrates a scenario in which operators may have a task of locating and communicating with a specific field device and performing actions on the device. This allows a user to quickly search for a respective field device among a plurality of similar devices in his or her vicinity using an image recognition feature with Li-Fi. The required field device be "pointed" on the display screen as facilitated by AR.

For example, as shown in the scenario in FIG. 8, image recognition identifies the type of device required, then using the disclosed Li-Fi approach, detects the device with Tag/ID details provided by the user. That is, a number of field devices 118 are shown in the display area 21 of the mobile device 17 in FIG. 8. The mobile device 17 is instructed to automatically point the laser to an individual field device 116 and a reply is received by such a device if ID details are matched. An operator is thus able to perform an identification/searching task automatically. The disclosed approach actually speeds up this task, while eliminating the need to manually check device tag details to search for a field device of interest.

Note that in some scenarios involving industrial plant displays and controls, a registered user may carry his or her mobile device around the industrial plant as he or she enters different zones. BLE (Bluetooth Low Energy) and/or Wi-Fi beacons can be located within the industrial plant for indoor tracking and to assist the user in interacting with the surroundings as he or she moves through the various zones. In addition, equipment equipped with an Li-Fi receiver assists in quickly accessing specific controls or parameters. The benefits of this approach include a secure method of communication facilitated with the disclosed Li-Fi communications. This approach also reduces GUI (Graphical User Interface) hardware costs in industrial plant settings while providing for a quick user interface that allows a user to search for and communicate with nearby field devices.

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object-oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, WiMAX, 802.xx, and cellular network, or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example, a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
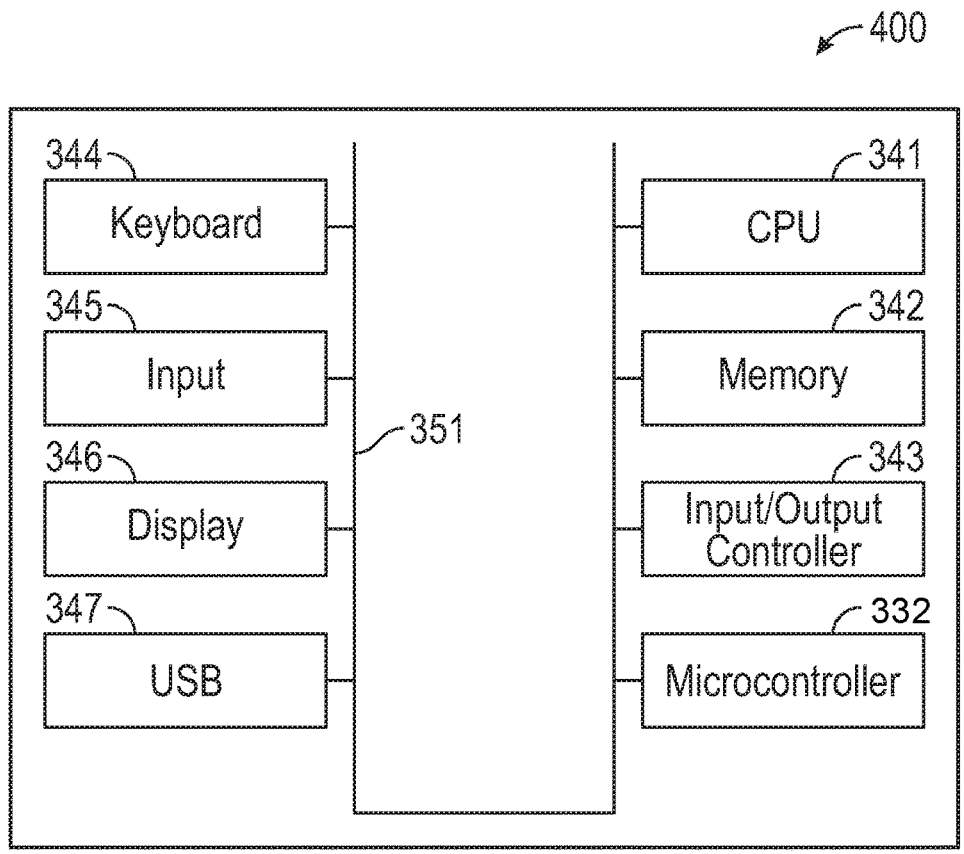
FIG. 9 illustrates a schematic view of a computer system/apparatus, which can be implemented in accordance with an example embodiment.
Figure 10:
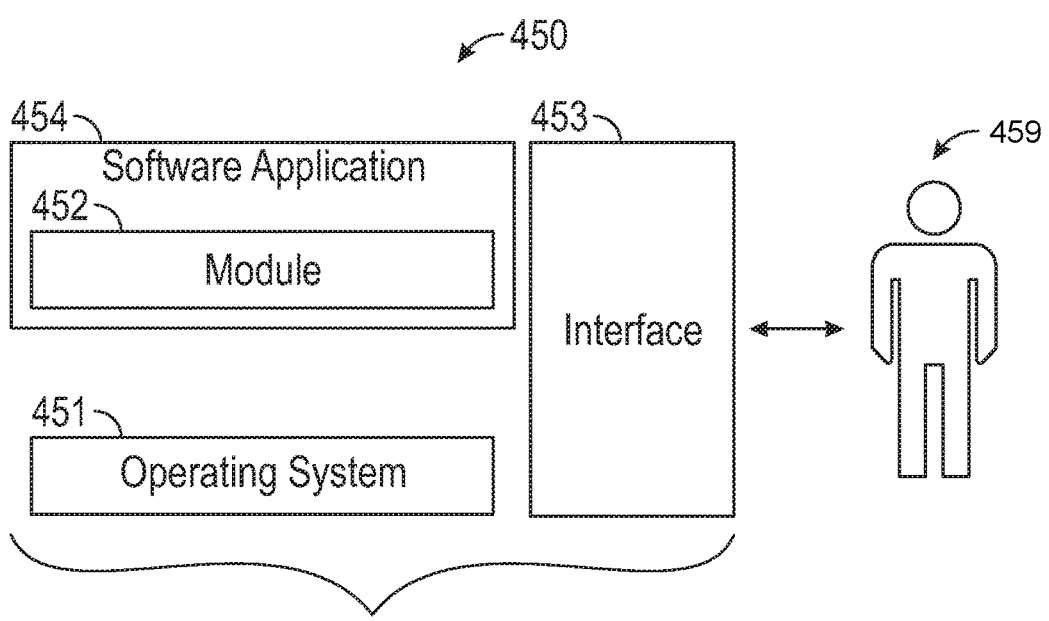
FIG. 10 illustrates a schematic view of a software system including a module, an operating system, and a user interface, which can also be implemented in accordance with an example embodiment.

FIGS. 9-10 are shown only as exemplary diagrams of data-processing environments in which example embodiments may be implemented. It should be appreciated that FIGS. 9-10 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 9, some example embodiments may be implemented in the context of a data-processing system/apparatus 400 that can include, for example, one or more processors such as a processor 341 (e.g., a CPU (Central Processing Unit) and/or other microprocessors), a memory 342, an input/output controller 343, and in some cases, a microcontroller 332. The system/apparatus 400 may also include a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc.), and/or other peripheral connections and components.

As illustrated, the various components of data-processing system/apparatus 400 can communicate electronically through a system bus 351 or similar architecture. The system bus 351 may be, for example, a subsystem that transfers data between, for example, computer components within data-processing system/apparatus 400 or to and from other data-processing devices, components, computers, etc. The data-processing system/apparatus 400 may be implemented in some embodiments as, for example, a server in a client-server based network (e.g., the Internet) or in the context of a client and a server (i.e., where aspects are practiced on the client and the server). The data-processing system/apparatus 400 may be implemented in some embodiments as, for example, server, a personal computer, a mobile device, and/or the other devices or systems, etc. In some cases, the data-processing system/apparatus 400 may be a client device such as discussed herein. In other cases, the system/apparatus 400 may function as a server in a client/server or other networking arrangement that communicates with client devices such as the hand held device 17.

Thus, the data-processing system/apparatus 400 may be, for example, a standalone desktop computer, a laptop computer, a Smartphone, a tablet computing device (e.g., iPad, Android-based tablet, etc.) and so on, wherein each such device is operably connected to and/or in communication with a client-server based network or other types of networks (e.g., cellular networks, Wi-Fi, etc.).

FIG. 10 illustrates a computer software system/apparatus 450 for directing the operation of the data-processing system/apparatus 400 depicted in FIG. 9. Software application 454 stored, for example, in memory 342 generally includes a kernel or operating system 451 and a shell or interface 453. One or more application programs, such as software application 454, may be "loaded" (i.e., transferred from, for example, mass storage or another memory location into the memory 342) for execution by the data-processing system/apparatus 400. The data-processing system/apparatus 400 can receive user commands and data through the interface 453; these inputs may then be acted upon by the data-processing system/apparatus 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement the various instructions or operations such as those discussed herein. Module 452 may also be composed of a group of modules or sub-modules that implement particular instructions, steps, or operations, such as discussed and illustrated herein with respect to FIGS. 1-8.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 9-10 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Figure 11:
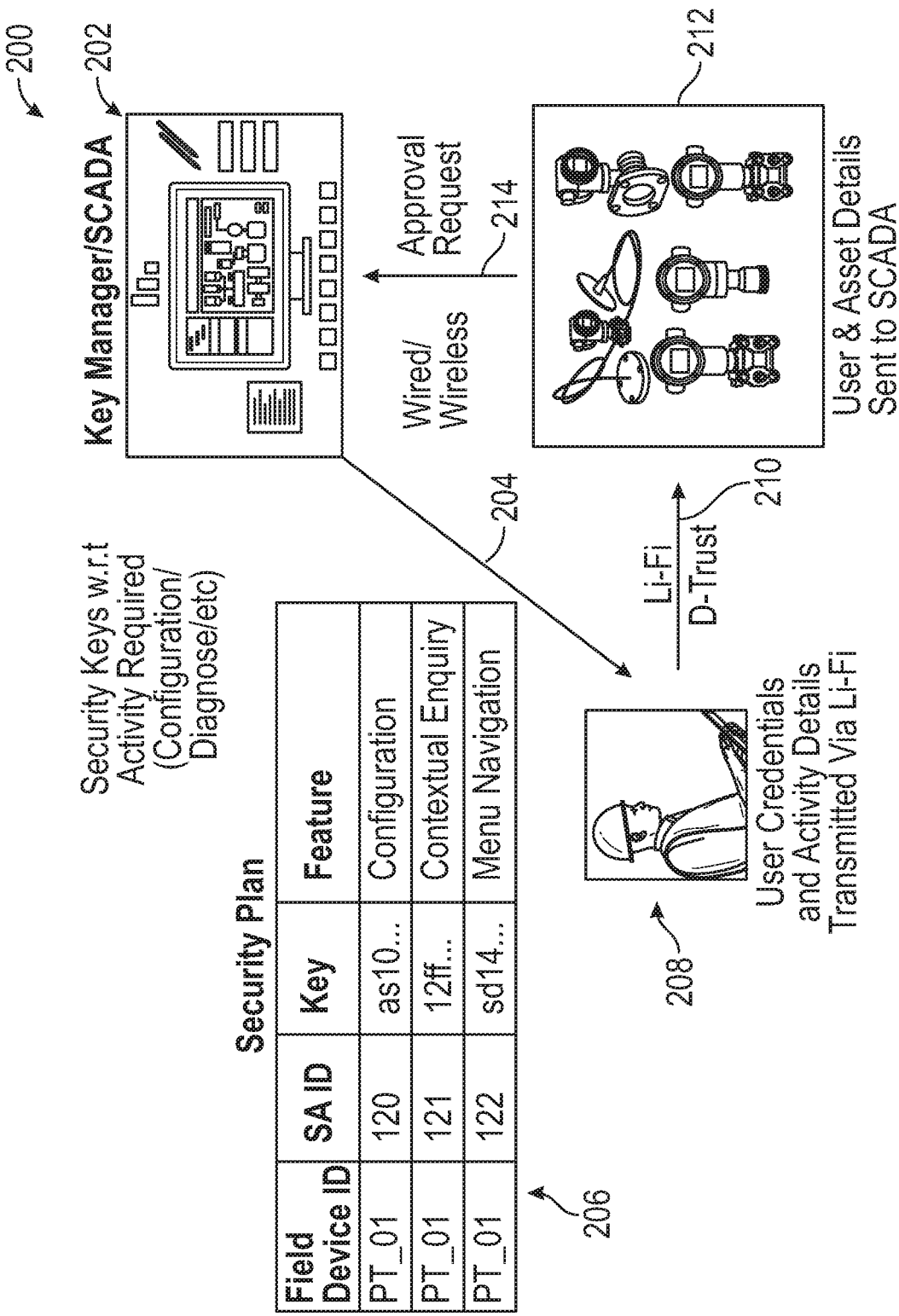
FIG. 11 illustrates a schematic diagram of a security system, which may be implemented in accordance with an example embodiment.

FIG. 11 illustrates a schematic diagram of a security system 200, which may be implemented in accordance with an example embodiment. It can be appreciated that embodiments may be implemented with secure communication with Li-Fi technology. Owing to absence of a security feature or a defined security protocol in a hand held device or in a field device, the communication is vulnerable to security threats such as masquerading, hacking, man-in-the-middle, eavesdrop attacks, etc. Hence, it is highly desirable to offer a security framework such as that of the example system 200 depicted in FIG. 11.

In some example embodiments, such as shown in FIG. 11, a three way handshake can be implemented involving a handheld/mobile device used by an operator, one or more field devices 212, and a SCADA/data link key management service provider shown as Key Manager/SCADA 202. This unique solution for handshake can be utilized for Contextual enquiry/maintenance.

A user 208 carrying a mobile device (such as, for example, the mobile device 17 discussed previously) can diagnose, configure, navigate, and/or contextually make inquiries regarding field transmitters only if the mobile device is subject to a security handshake. As shown in FIG. 11, a handshake procedure can be implemented where the user 208 obtains secured access based on the activity (e.g., Configure/Diagnose/Navigate/Maintenance/etc.) he or she wants to perform. The user 208 can share his or her credentials along with the activity that the user wants to carry out to the device over Li-Fi such as indicated by arrow 210 in FIG. 11 (i.e., the arrow 210 represents Li-Fi and D-Trust). The details shared by user and asset details can be passed to SCADA (e.g., the Key Manager/SCADA 202) for authentication of both the device and the user by SCADA. SCADA verifies both the device and the user with its preconfigured database and accordingly confirms for authentication. In some cases, application specific authentication can be provided. Thus, data exchanges facilitated over all the transmitters in the field can be secured by way of authentication.

As shown in FIG. 11, a security plan 206 can include security associations specific to a particular application (e.g., SAs) such as in SA ID 120, a Device ID is associated to the device feature key "af10 . . . " and so on. The purpose of this approach is to provide access for device configuration. Similarly, SA ID 121 uses a different device feature key to secure contextual enquiry unicast messages with Device 1. The arrow 204 shown in FIG. 11 represents the transmission of security keys with respect to the required activity discussed above (i.e., Configure/Diagnose/Navigate/Maintenance/etc.). The arrow 214 shown in FIG. 11 represents an approval request (i.e., wired and/or wireless).

Note that other advantages of the disclosed embodiments can include the implementation of a record of user credentials, accessing the device, are stored in a transmitter memory for future references. In addition, as discussed previously, data can be visualized based on the person's role and application (e.g., Engineer/Plant manager/administrator). A further advantage of the disclosed embodiments is that communication using optical wireless communication using visible light or infrared does not cross walls; thus, such communications should be 100% cyber security safe. The use of optical wireless communication also does not interfere with existing radio communication, and does not have any impact on other electronic instruments. These advantages make the use of optical wireless communication an ideal solution for establishing a communications channel between field transmitters and hand held devices.

Figure 12:
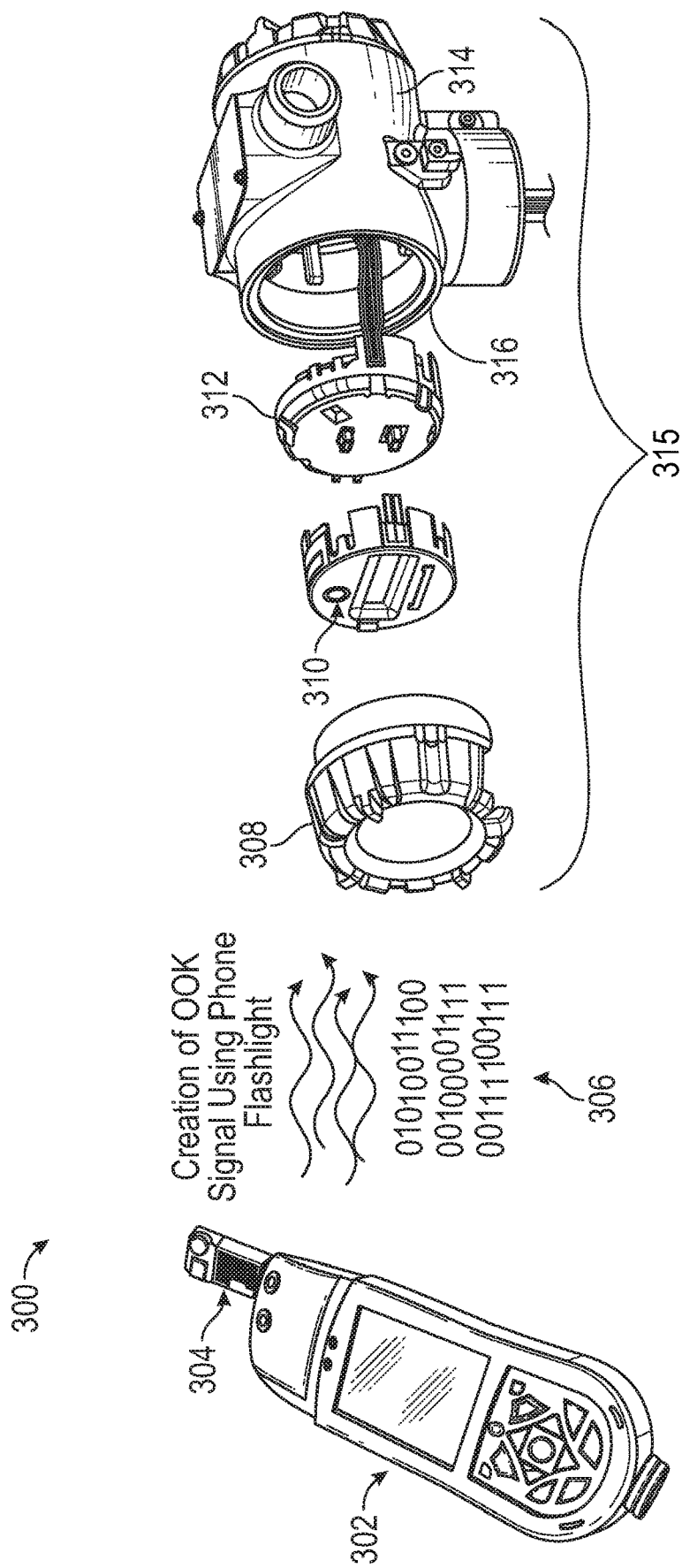
FIG. 12 illustrates a schematic diagram of an HART to Li-Fi communicator adaptor, in accordance with an example embodiment.

FIG. 12 illustrates a schematic diagram of an HART (Highway Addressable Remote Transducer) to Li-Fi communicator adaptor, in accordance with an example embodiment. Note that as utilized herein, HART refers generally to a HART (Highway Addressable Remote Transducer) Protocol. As shown in FIG. 12, an external Li-Fi adapter 304 plugin can be fixed over existing legacy transmitters and by enabling bidirectional Li-Fi communication in field devices, wireless communication can be established. An example field device 315 with integrated Li-Fi capabilities is shown FIG. 12. The example field device 315 includes an end cap 308 with respect to a photodiode 310 for Li-Fi located above a display module.

The field device 315 further includes a communications module connected to a sensor cable. The display module, the communications module 312, and the sensor cable 316 can be maintained within an electronics housing 314. The hand held device 302 thus includes the Li-Fi adapter 304 which enables the hand held device 302 to communicate via Li-Fi with the field device 315. The graphic 306 shown to the right of the hand held device 302 in FIG. 11 indicates the creation of an OOK signal using a phone flashlight, thus enabling Li-Fi communications between the field device 315 and the hand held device 302.

Thus, a method for establishing seamless secure three way handshake communication between handhelds/mobile, field device, and SCADA/data link key management service providers can be implemented. The disclosed embodiments include a secured system topology that determines which nodes are to be secured, which nodes can communicate with devices, and how data is passed. This unique solution for hand shake can be utilized, for example, for contextual enquiry/maintenance.

Additional advantages include the fact that the disclosed approach is more robust and secured than conventional approaches and also offer a session-based security login. The disclosed approach also provides high levels of security to prevent unauthorized access, eliminate eavesdropping, and restricting device control to only users with specific predefined privileges. All user attempts to access the SCADA system, or actions (such as firmware upgrade, maintenance) are logged in an unalterable "syslog" record.

With line-of-sight communication over Li-Fi, this approach offers a secure method and system for linking together field devices and handheld/mobile, thereby eliminating the security concerns such as remote jamming, eavesdropping. The disclosed embodiments can also include the concept of firmware upgrade for multiple devices in parallel.

In addition, the disclosed embodiments include displaying a plurality of AR images, detecting a gaze of a user, determining a target object based on the gaze of the user, identifying an associated AR image that is associated with the target object and overlaying the process data once communication is established over a wireless link. Additionally, the user's gaze direction can be derived from the head's normal vector to disambiguate multimodal 3D interaction in immersive AR environments. Using AR Image Recognition approach with Li-Fi, an operator is able to perform device identification and searching tasks autonomously, while eliminating the need to manually check device tag details as part of a search for devices of interest in the vicinity of the user.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function. For example, some embodiments may be implemented in the context of a special-purpose computer instead of a general-purpose computer or vice versa.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the following claims and the principles and novel features disclosed herein.

The invention claimed is:

1. A method for identifying and connecting to field devices in an industrial plant, said method comprising:
   providing credentials associated with a user through Li-Fi (Light Fidelity) wireless communications comprising visible light communication and a subset of OWC (Optical Wireless Communications) that includes at least one of: UV visible-light communications or infrared and near-ultraviolet communications, said Li-Fi wireless communications further comprising a communications system in which information is encoded with a light signal located in a visible part of an electromagnetic spectrum and further includes an LED (Laser Emitting Diode) that provides a light signal in a visible range, wherein said light signal is intensity-modulated to allow information transmission;
   detecting in said light signal, a light pattern associated with said Li-Fi wireless communications with a light sensor attached to a field device;
   transmitting a signal from said light sensor to a controller, which decodes said credentials associated with said user; and
   if said credentials are found to be authorized in response to decoding said credentials, allowing said user to obtain device data associated with said field device wherein said data includes a location of said field device within said industrial plant; and
   detecting said field device having said data including said location of said field device with said industrial device using a mobile device equipped with an automatic moving laser dongle that automatically points a laser to field devices in a range of a camera visibility of a camera associated with said mobile device to detect said field device having said data including said location of said field device within said industrial plant.

2. The method of claim 1 wherein said data associated with said field device is obtained from a server over a wireless data communications network, said server in communication with said wireless data communications network.

3. The method of claim 1 wherein said data associated with said field device is obtained from a control room over a wireless data communications network.

4. The method of claim 3 further comprising:
   displaying said data as AR (Augmented Reality) data via a display screen associated with said mobile device.

5. The method of claim 2 wherein said server comprises a cloud based server.

6. The method of claim 2 wherein said server comprises a mobility server that maintains a database including said data and information that associates said field device with an authorized user, said data including actions and events between said field device and said authorized user.

7. The method of claim 4 wherein said Li-Fi wireless communications includes line-of-sight communications over Li-Fi, which facilitates a secure link between said field device and said mobile device, which eliminates security issues including remote jamming eavesdropping.

8. The method of claim 1 wherein said credentials are authorized via an application specific authentication mechanism.

9. The method of claim 1 wherein aid credentials are authorized via a unique security plan comprising associations specific to a particular application to provide access for device configuration.

10. The method of claim 4 wherein said Li-Fi wireless communications are enabled by a HART (Highway Addressable Remote Transducer) Protocol to Li-Fi communicator adaptor, wherein said Li-Fi communicator adaptor is integrated with said mobile device.

11. A system for identifying and connecting to field devices in an industrial plant, said system comprising:
   Li-Fi (Light Fidelity) wireless communications, wherein credentials associated with a user are provided through said Li-Fi wireless communications comprising visible light communication and a subset of OWC (Optical Wireless Communications) that includes at least one of: UV visible-light communications or infrared and near-ultraviolet communications, said Li-Fi wireless communications further comprising a communications system in which information is encoded with a light signal located in a visible part of an electromagnetic spectrum and further includes an LED (Laser Emitting Diode) that provides a light signal in a visible range, wherein said light signal is intensity-modulated to allow information transmission;
   a light sensor attached to a field device, wherein a light pattern associated with said Li-Fi wireless communications is detectable in said light signal utilizing said light sensor attached to said field device;
   a controller wherein a signal is transmitted from said light sensor to said controller, which decodes said credentials associated with said user, wherein if said credentials are authorized, said user is allowed to obtain device data associated with said field device wherein said data includes a location of said field device within said industrial plant; and
   a mobile device equipped with an automatic moving laser dongle that automatically points a laser to field devices in a range of a camera visibility of a camera associated with said mobile device to detect said field device having said data including said location of said field device within said industrial plant.

12. The system of claim 11 wherein said data associated with said field device is obtained from a server over a wireless data communications network, said server in communication with said wireless data communications network.

13. The system of claim 11 wherein said data associated with said field device is obtained from a control room over a wireless data communications network.

14. The system of claim 13 further comprising:
a display screen for displaying said data as AR (Augmented Reality) data via said display screen associated with said mobile device.

15. The system of claim 12 wherein said server comprises a cloud based server.

16. The system of claim 12 wherein said server comprises a mobility server that maintains a database including said data and information that associates said field device with an authorized user, said data including actions and events between said field device and said authorized user.

17. The system of claim 14 wherein said Li-Fi wireless communications includes line-of-sight communications over Li-Fi, which facilitates a secure link between said field device and said mobile device, which eliminates security issues including remote jamming eavesdropping.

18. The system of claim 11 wherein said credentials are authorized via an application specific authentication mechanism.

19. The system of claim of claim 11 wherein said credentials are authorized via a unique security plan comprising associations specific to a particular application to provide access for device configuration.

20. The system of claim 14 wherein said Li-Fi wireless communications are enabled by a HART (Highway Addressable Remote Transducer) Protocol to Li-Fi communicator adaptor, wherein said Li-Fi communicator adaptor is integrated with said mobile device.

* * * * *